United States Patent [19]

Winston

[11] Patent Number: 4,883,029
[45] Date of Patent: Nov. 28, 1989

[54] PISTON AND PISTON RING CONSTRUCTION

[75] Inventor: John H. Winston, Menomonee Falls, Wis.

[73] Assignee: Outboard Marine Corporation, Waukegan, Ill.

[21] Appl. No.: 35,596

[22] Filed: Apr. 7, 1987

[51] Int. Cl.⁴ .............................. F16J 9/20; F16J 9/24; F02F 5/00
[52] U.S. Cl. .................. 123/193 P; 92/208; 277/136; 277/137; 277/181
[58] Field of Search .............. 277/136, 137, 216, 181, 277/192, 193; 123/193 P; 92/218, 172, 216, 208

[56] References Cited

U.S. PATENT DOCUMENTS

| | | |
|---|---|---|
| 356,014 | 1/1887 | Small et al. |
| 372,058 | 10/1887 | Barr . |
| 1,750,356 | 3/1930 | Ragsdale .......................... 277/137 |
| 2,006,972 | 7/1935 | Vincent et al. .................. 277/136 X |
| 2,248,779 | 7/1941 | Phillips . |
| 2,428,177 | 9/1947 | Phillips . |
| 3,003,799 | 10/1961 | Marchionda et al. . |
| 3,391,942 | 7/1968 | Riley ............................... 277/137 |
| 3,554,564 | 1/1971 | Lassanske ........................ 277/170 |
| 4,111,438 | 9/1978 | Longfoot .......................... 277/148 |
| 4,212,473 | 7/1980 | Arai .................................. 277/193 X |
| 4,367,702 | 1/1983 | Lassanske ........................ 123/182 |
| 4,522,415 | 6/1985 | Dworak et al. .................. 277/216 |
| 4,572,520 | 2/1986 | Shinada ............................ 277/140 |

FOREIGN PATENT DOCUMENTS

| | | | |
|---|---|---|---|
| 17848 | 1/1930 | Australia ....................... 277/136 |
| 1156722 | 5/1958 | France ........................... 277/136 |
| 441224 | 1/1936 | United Kingdom ............ 277/137 |
| 551855 | 2/1943 | United Kingdom ............ 277/137 |

Primary Examiner—Allan N. Shoap
Attorney, Agent, or Firm—Michael, Best & Friedrich

[57] ABSTRACT

A piston assembly comprising a piston reciprocally movable along an axis and including a generally cylindrical outer surface having therein a circumferentially extending groove partially defined by a surface having therein a recess, and a piston ring located in the groove and including a lower surface extending generally perpendicularly to the axis, a first arcuate segment having an upper surface inclined radially inwardly and downwardly and having a maximum thickness and a radially inwardly decreasing thickness, and a second arcuate segment extending into the recess and having a substantially constant thickness across the radial extent thereof, the constant thickness being substantially equal to the maximum thickness.

10 Claims, 2 Drawing Sheets

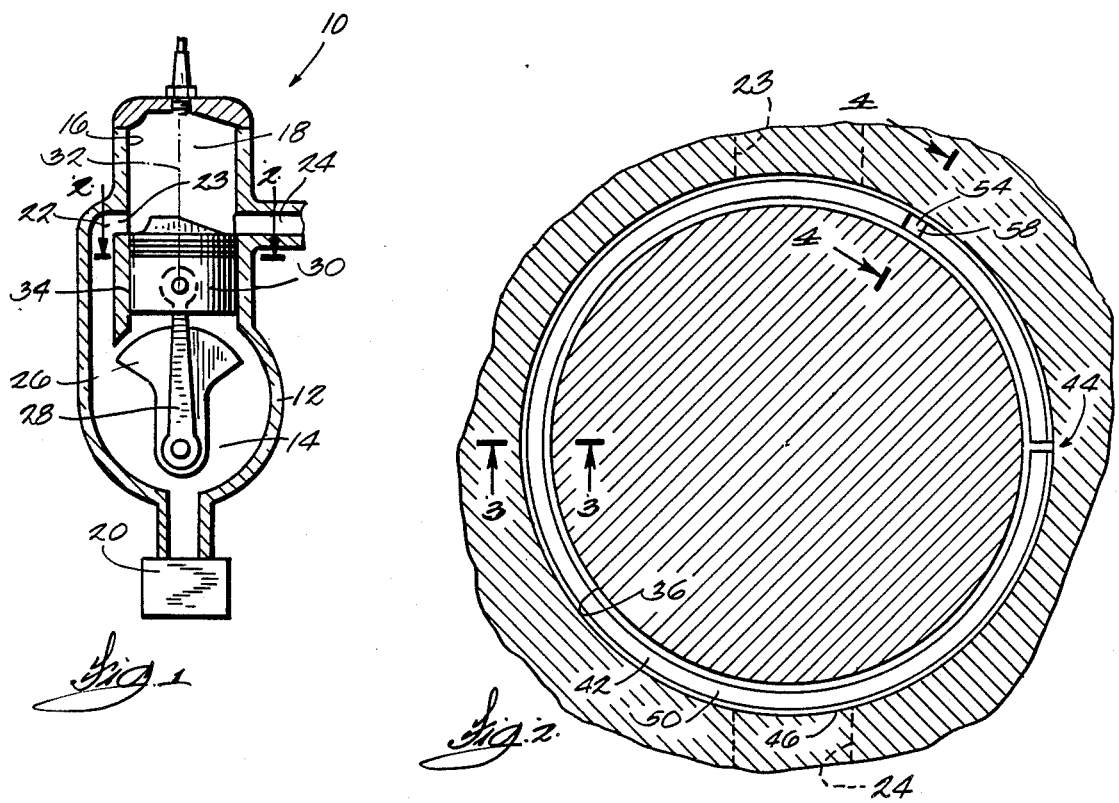
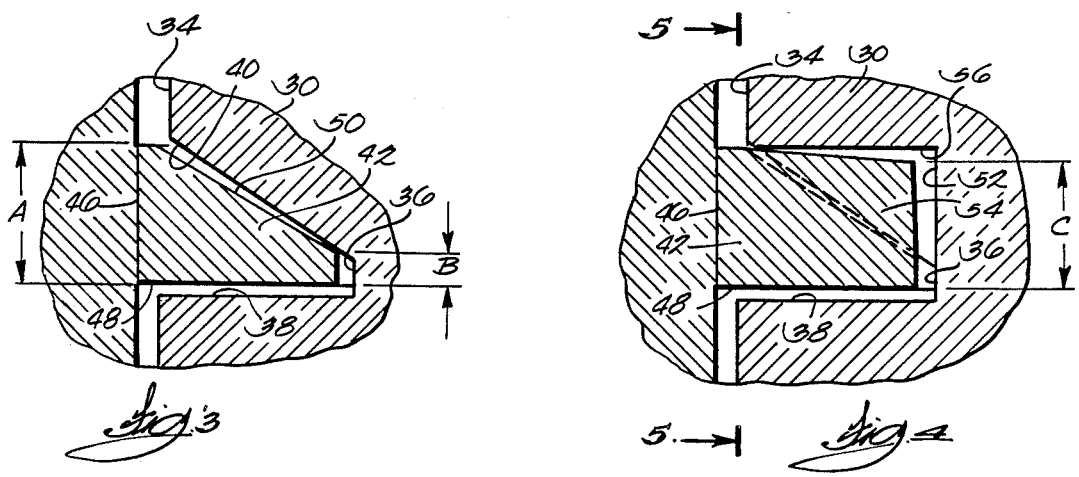
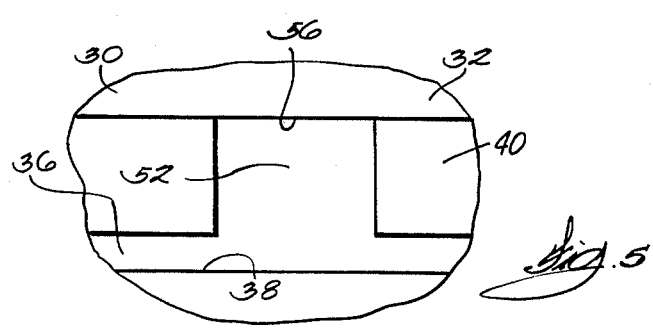

PISTON AND PISTON RING CONSTRUCTION

BACKGROUND OF THE INVENTION

The invention relates to internal combustion engines, and, more particularly, to internal combustion engine piston ring constructions.

It is known to provide a piston and a piston ring with interengaging means for preventing rotation of the piston ring relative to the piston. Attention is directed to the following U.S. patents:

| Small, et al. | 356,014 | Jan. 11, 1887 |
| W. M. Barr | 372,058 | Oct. 25, 1887 |
| Ragsdale | 1,750,356 | March 11, 1930 |
| Phillips | 2,248,779 | July 8, 1941 |
| Phillips | 2,428,177 | Sept. 30, 1947 |
| Marchionda, et al. | 3,003,799 | Oct. 10, 1961 |
| Riley | 3,391,943 | July 9, 1968 |
| Longfoot | 4,111,438 | Sep. 5, 1978 |
| Dworak, et al. | 4,522,415 | Jun. 11, 1985 |
| Shinada | 4,572,520 | Feb. 25, 1986 |
| Lassanske | 3,554,564 | Jan. 12, 1971 |
| Lassanske | 4,367,702 | Jan. 11, 1983 |

SUMMARY OF THE INVENTION

The invention provides a piston assembly comprising a piston reciprocally movable along an axis and including a generally cylindrical outer surface having therein a circumferentially extending groove, including a bottom land extending generally perpendicularly to the axis, and a top land extending radially inwardly and downwardly and at a first acute angle relative to the bottom, which top land has therein a recess extending axially of the piston, and a piston ring located in the groove and including a generally cylindrical outer surface, a bottom surface extending generally perpendicularly to the outer surface, a top surface extending radially inwardly and downwardly and at a second acute angle relative to the bottom surface, which second angle is less than the first angle, and an internal projection extending from the top surface and an integral projection received in the recess for preventing the piston ring from rotating relative to the piston.

The invention also provides a piston assembly comprising a piston reciprocally movable along an axis and including a generally cylindrical outer surface having therein a circumferentially extending groove, the groove being partially defined by a surface extending transversely to the axis and having therein a recess extending axially of the piston, and a piston ring located in the groove and including a first arcuate segment with a radially outwardly diverging cross section having an inner periphery with an axial thickness, and a second arcuate segment connected to the first segment extending into the recess and having an inner periphery with an axial thickness, the axial thickness of the second segment being greater than the thickness of the first segment.

In one embodiment, the second arcuate segment has an arcuate extent of less than five degrees.

The invention also provides a piston assembly comprising a piston reciprocally movable along an axis and including a generally cylindrical outer surface having therein a circumferentially extending groove partially defined by a surface having therein a recess, and a piston ring located in the groove and including a lower surface extending generally perpendicularly to the axis, a first arcuate segment having an upper surface inclined radially inwardly and downwardly and having a maximum thickness and a radially inwardly decreasing thickness, and a second arcuate segment connected to the first segment extending into the recess and having a substantially constant thickness across the radial extent thereof, the constant thickness being substantially equal to the maximum thickness.

The invention also provides an internal combustion engine comprising an engine block including a generally cylindrical inner surface defining a cylinder bore having therein an intake port, a piston received in the cylinder bore for reciprocal movement, the piston including a generally cylindrical outer surface facing the inner surface and having therein a circumferentially extending groove, and the piston having a circumferential portion located closest to the intake port, and a piston ring located in the groove and sealingly engaging the inner surface, the piston and the piston ring including interengaging means located on the portion of the piston for preventing rotation of said piston ring relative to the piston.

In one embodiment, the interengaging means is located adjacent the intake port.

In one embodiment, the interengaging means includes, in the groove, a recess, and, on the piston ring, an integral projection received in the recess.

In one embodiment, the piston moves along an axis, the groove is partially defined by a surface extending transversely to the axis and having therein the recess, and the recess extends axially of the piston.

A principal feature of the invention is the provision of a piston ring groove having therein a recess extending axially of the piston, and a piston ring including an integral projection received in the recess.

Another principal feature of the invention is the provision of a wedge-shaped piston ring including an arcuate segment having a radially inward thickness greater than the radial thickness of the remainder of the piston ring. Thus, the arcuate segment forms an integral projection which extends axially of the piston relative to the remainder of the piston ring.

Another principal feature of the invention is the provision of interengaging means located on the low-temperature side of the piston (the side closest to the intake port) for preventing rotation of the piston ring relative to the piston.

Other features and advantages of the invention will become apparent to those skilled in the art upon review of the following detailed description, claims, and drawings.

DESCRIPTION OF THE DRAWINGS

FIG. 1 is a side elevational view, partially in cross section, of an internal combustion engine embodying the invention.

FIG. 2 is a view taken along line 2—2 in FIG. 1 and showing the alignment of the intake port and of the exhaust passage.

FIG. 3 is a view taken along line 3—3 in FIG. 2.

FIG. 4 is a view taken along line 4—4 in FIG. 2.

FIG. 5 is a view taken along line 5—5 in FIG. 4 and with the piston ring removed.

Figure 6:
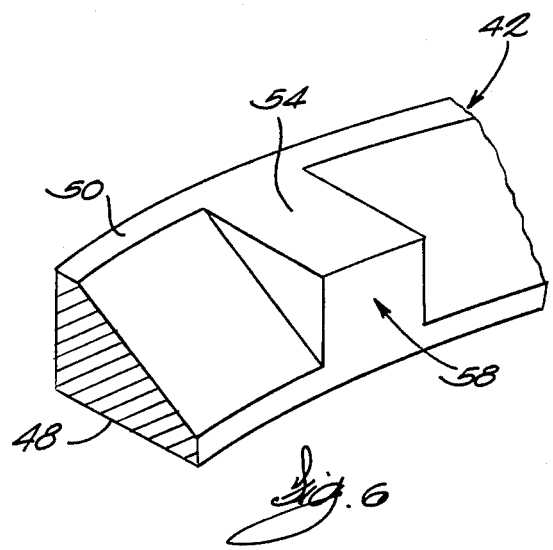
FIG. 6 is a perspective view of a portion of the piston ring shown in FIGS. 2 through 5.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An internal combustion engine 10 embodying the invention is illustrated in FIG. 1. In the illustrated construction, the engine 10 is a conventional two-cycle engine, although the invention is also applicable to four-cycle engines.

The engine 10 comprises an engine block 12 including a crankcase chamber 14, and a generally cylindrical inner surface 16 defining a cylinder bore 18. The engine 10 also comprises a carburetor 20 communicating with the crankcase chamber 14, and a transfer or intake passage 22 communicating between the crankcase chamber 14 and the cylinder bore 18. The transfer passage 22 communicates with the cylinder bore 18 via an intake port 23. The engine 10 also comprises an exhaust passage 24 communicating with the cylinder bore 18. The engine 10 further comprises a crankshaft 26 rotatably mounted in the crankcase chamber 14, a connecting rod 28 pivotally connected to the crankshaft 26, and a piston 30 pivotally connected to the connection rod 28.

The piston 30 is reciprocally movable along an axis 32 and includes a generally cylindrical outer surface 34 facing the inner surface 16 of the cylinder bore 18 and having therein (see FIGS. 2-5) a circumferentially extending groove 36. The groove 36 is defined by a bottom land or surface 38 extending generally perpendicularly to the piston axis 32, and by a top land or surface 40 extending transversely to the piston axis 32, and, more particularly, extending radially inwardly and downwardly and at a first acute angle relative to the bottom land 38.

The engine 10 further comprises a piston ring 42 similar to the pressure-backed piston ring disclosed in U.S. Lassanske Patent No. 3,554,564, which is incorporated herein by reference. Preferably, the piston ring 42 is made of powdered metal. The piston ring 42 has opposite ends spaced apart to form a gap 44 and includes a generally cylindrical outer surface 46 facing the cylinder bore inner surface 16. Also, the piston ring 42 has a radially outwardly flared cross-section. In other words, the piston ring 42 is wedge-shaped and diverges in the radially outward direction. More specifically, the piston ring has a maximum axial thickness "A" at the outer periphery thereof, has an axial thickness which decreases from the outer periphery to the inner periphery, and has an axial thickness "B" at the inner periphery less than the axial thickness at the outer periphery.

In the preferred embodiment, the piston ring 42 has a bottom surface 48 extending generally perpendicularly to the piston axis 32, and an upper surface 50 which is inclined or sloped radially inwardly and downwardly at a second acute angle relative to the bottom surface 48 of the piston ring 42, which second angle is less than the above-mentioned first angle.

The piston ring 42 and the piston 30 include interengaging means for preventing rotation of the piston ring 42 relative to the piston 30. This means includes, in the top land 40 of the groove 36, a recess 52 extending upwardly or axially of the piston 30, and, on the piston ring 42, an integral projection 54 extending axially of the piston 30 and received in the recess 52.

In the preferred embodiment, the piston 30 includes a surface 56 extending generally parallel to the bottom land 38 and partially defining the recess 52, and the piston ring 42 includes an arcuate segment 58 which forms the above-mentioned projection 54. As shown in FIG. 4, the arcuate segment 58 is generally rectangular in cross-section and accordingly has a substantially constant axial thickness across the radial extent thereof, which axial thickness is substantially equal to the maximum axial thickness "A" of the piston ring, so that the arcuate segment 58 has, at the inner periphery thereof, an axial thickness "C" that is greater than the axial thickness "B" of the remainder of the piston ring 42. Actually, in the illustrated construction, the arcuate segment 58 slopes inwardly and downwardly at an angle of approximately 3 degrees from horizontal. This angle reduces "sticking" of the piston ring 42.

Thus, the piston ring 42 is comprised of a first arcuate segment which is wedge-shaped, and a second arcuate segment (the segment 58) which is generally rectangular in cross-section. In the preferred embodiment, the arcuate segment 58 has an arcuate extent of less than 5 degrees.

In the preferred embodiment, the recess 52 in the piston 30 is located such that the gap 44 is not aligned with any of the ports communicating with the cylinder bore 18. This prevents the ends of the piston ring 42 from extending outwardly into a port and being broken off. Also, the recess 52 is located so that the arcuate segment 58 is in an area of relatively low piston temperature, i.e., on the circumferential portion or side of the piston 30 closest to the intake port 23 and farthest from the exhaust passage 24. More particularly, as shown in FIG. 2, the recess 52 and arcuate segment 58 are located adjacent the intake port 23. While in the preferred embodiment the recess 52 is not aligned with the intake port 23, so that the recess 52 and arcuate segment 58 will not pass over the intake port 23, it is to be understood that the phrase "adjacent the intake port 23" is intended to cover both the illustrated arrangement and an arrangement wherein the recess 52 is aligned with the intake port 23. In both cases, the arcuate segment 58 is in a low-temperature area. This will prolong the life of the arcuate segment 58.

Various features of the invention are set forth in the following claims.

I claim:

1. An engine comprising an engine block including a generally cylindrical inner surface defining a cylinder bore, a piston received in said cylinder bore for reciprocal movement along an axis, said piston including a generally cylindrical outer surface facing said inner surface and having therein a circumferentially extending groove including a bottom land extending generally perpendicularly to said axis, and a top land extending radially inwardly and downwardly and at a first acute angle relative to said bottom land, said top land having therein a recess extending axially of said piston, and a piston ring located in said groove and sealingly engaging said inner surface, said piston ring including a generally cylindrical outer surface, a bottom surface extending generally perpendicularly to said outer surface, a top surface extending radially inwardly and downwardly and at a second acute angle relative to said bottom surface, said second angle being less than said first angle, and an integral projection extending from said top surface and received in said recess for preventing rotation of said piston ring relative to said piston.

2. An internal combustion engine comprising an engine block including a generally cylindrical inner surface defining a cylinder bore having therein an intake port, a piston received in said cylinder bore for reciprocal movement axially of said cylinder, said piston including a generally cylindrical outer surface facing said inner surface and having therein a circumferentially extending groove partially defined by a surface extending transversely to said axis and including a circumferential portion located adjacent to said intake port, and a recess extending axially of said piston and from said circumferential portion, and a piston ring located in said groove and sealingly engaging said inner surface and including a first arcuate segment having upper and lower radially extending surfaces which radially outwardly diverge and having an inner periphery with an axial thickness, and a second arcuate segment connected to said first segment, extending into said recess, and having an inner periphery with an axial thickness, said axial thickness of said second segment being greater than said axial thickness of said first segment for preventing rotation of said piston ring relative to said piston.

3. An engine comprising an engine block including a generally cylindrical inner surface defining a cylinder bore having therein an intake port, a piston received in said cylinder bore for reciprocal movement along an axis, said piston including a generally cylindrical outer surface facing said inner surface and having therein a circumferentially extending groove having a bottom land extending generally perpendicularly to said axis, and a top land extending radially inwardly and downwardly and at a first acute angle relative to said bottom land and having therein an axially extending recess located adjacent to said intake port, and a piston ring located in said groove and including a generally cylindrical outer surface sealingly engaging said inner surface, a bottom surface extending generally perpendicularly to said outer surface, and a top surface extending radially inwardly and downwardly and at a second acute angle relative to said bottom surface, said second angle being less than said first angle, said piston ring also including an integral projection received in said recess for preventing rotation of said piston ring relative to said piston.

4. A piston assembly comprising a piston reciprocally movable along an axis and including a generally cylindrical outer surface having therein a circumferentially extending groove including a bottom land extending generally perpendicularly to said axis, and a top land extending radially inwardly and downwardly and at a first acute angle relative to said bottom land, said top land having therein a recess extending axially of said piston, and a piston ring located in said groove and including a generally cylindrical outer surface, a bottom surface extending generally perpendicularly to said outer surface, a top surface extending radially inwardly and downwardly and at a second acute angle relative to said bottom surface, said second angle being less than said first angle, and an integral projection extending from said top surface and received in said recess for preventing said piston ring from rotating relative to said piston.

5. A piston assembly comprising a piston reciprocally movable along an axis and including a generally cylindrical outer surface having therein a circumferentially extending groove, said groove being partially defined by a surface extending transversely to said axis and having therein a recess extending axially of said piston, and a piston ring located in said groove and including a first arcuate segment having upper and lower radially extending surfaces which radially outwardly diverge and having an inner periphery with an axial thickness, and a second arcuate segment connected to said first segment, extending into said recess and having an inner periphery with an axial thickness, said axial thickness of said second segment being greater than said axial thickness of said first segment.

6. A piston assembly as set forth in claim 5 wherein said groove has a bottom land extending generally perpendicularly to said axis, and a top land extending radially inwardly and downwardly and at a first acute angle relative to said bottom land, and wherein said piston ring includes a generally cylindrical outer surface, a bottom surface extending generally perpendicularly to said outer surface, and a top surface extending radially inwardly and downwardly and at a second acute angle relative to said bottom surface, said second angle being less than said first angle.

7. A piston assembly as set forth in claim 5 wherein said second arcuate segment has an arcuate extent of less than five degrees.

8. A piston assembly comprising a piston reciprocally movable along an axis and including a generally cylindrical outer surface having therein a circumferentially extending groove partially defined by a surface having therein a recess, and a piston ring located in said groove and including a lower surface extending generally perpendicularly to said axis, a first arcuate segment having an upper surface inclined radially inwardly and downwardly and having a maximum thickness and a radially inwardly decreasing thickness, and a second arcuate segment connected to said first segment, extending into said recess and having a substantially constant thickness across the radial extent thereof, said constant thickness being substantially equal to said maximum thickness.

9. A piston assembly as set forth in claim 8 wherein said groove has a bottom land extending generally perpendicularly to said axis, and a top land extending radially inwardly and downwardly and at a first acute angle relative to said bottom land, and wherein said piston ring includes a generally cylindrical outer surface, a bottom surface extending generally perpendicularly to said outer surface, and a top surface extending radially inwardly and downwardly and at a second acute angle relative to said bottom surface, said second angle being less than said first angle.

10. A piston assembly as set forth in claim 8 wherein said second arcuate segment has an arcuate extent of less than five degrees.

* * * * *